United States Patent
Schnittger et al.

(10) Patent No.: US 11,617,982 B2
(45) Date of Patent: Apr. 4, 2023

(54) ARRANGEMENT FOR A UTILITY VEHICLE

(71) Applicant: KNORR-BREMSE Systeme fuer Nutzfahrzeuge GmbH, Munich (DE)

(72) Inventors: Karsten Schnittger, Munich (DE); Christian Kuhlen, Aschheim (DE); Fabian Griesser, Munich (DE); Andreas Leinung, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 373 days.

(21) Appl. No.: 16/772,248

(22) PCT Filed: Dec. 4, 2018

(86) PCT No.: PCT/EP2018/083518
§ 371 (c)(1),
(2) Date: Jun. 12, 2020

(87) PCT Pub. No.: WO2019/115295
PCT Pub. Date: Jun. 20, 2019

(65) Prior Publication Data
US 2021/0093991 A1   Apr. 1, 2021

(30) Foreign Application Priority Data
Dec. 14, 2017   (DE) .................. 10 2017 129 908.4

(51) Int. Cl.
*B60T 17/00*   (2006.01)
*B01D 53/04*   (2006.01)
(Continued)

(52) U.S. Cl.
CPC ..... *B01D 53/0454* (2013.01); *B01D 53/0415* (2013.01); *B01D 53/0438* (2013.01);
(Continued)

(58) Field of Classification Search
CPC ................ B01D 53/04; B01D 53/0454; B01D 53/0415; B01D 53/0438; B01D 53/26;
(Continued)

(56) References Cited

U.S. PATENT DOCUMENTS

| 2003/0075234 A1 | 4/2003 | Baltes |
| 2005/0173204 A1 | 8/2005 | Baumgartner et al. |

(Continued)

FOREIGN PATENT DOCUMENTS

| BR | 102016018053-8 A2 | 2/2017 |
| CN | 102186706 A | 9/2011 |

(Continued)

OTHER PUBLICATIONS

Chinese-language Office Action issued in Chinese Application No. 201880080520.4 dated Nov. 30, 2021 with English translation (19 pages).

(Continued)

*Primary Examiner* — Frank M Lawrence, Jr.
(74) *Attorney, Agent, or Firm* — Crowell & Moring LLP

(57) ABSTRACT

An arrangement for a utility vehicle includes at least one air dryer unit and a regulating unit, wherein the air dryer unit and the regulating unit are designed in each case as separate units. The air dryer unit has at least one air dryer module, in particular an air dryer cartridge, at least one discharge valve and at least one control line for the pneumatic control of the discharge valve. At least one connecting line is provided in the air dryer unit with connection to the air dryer module. The connecting line leads directly to a consumer non-return valve for the air dryer unit, which is arranged outside of the air dryer unit, wherein the connecting line can be used at least partially bi-directionally and/or can be or is connected to a bi-directionally usable line section.

13 Claims, 3 Drawing Sheets

(51) Int. Cl.
    *B01D 53/26*     (2006.01)
    *F15B 21/048*     (2019.01)
    *B60T 17/02*     (2006.01)
    *B60T 17/04*     (2006.01)

(52) U.S. Cl.
    CPC .......... *B01D 53/261* (2013.01); *B60T 17/004* (2013.01); *F15B 21/048* (2013.01); *B01D 2257/80* (2013.01); *B60T 17/02* (2013.01); *B60T 17/04* (2013.01); *F15B 2211/30505* (2013.01); *F15B 2211/50536* (2013.01); *F15B 2211/8855* (2013.01)

(58) Field of Classification Search
    CPC .............. B01D 53/261; B01D 2257/80; B01D 2258/06; B60T 17/004; B60T 17/02; B60T 17/04; B60T 17/00; F15B 21/048; F15B 2211/30505; F15B 2211/50536; F15B 2211/8855; F16K 15/18; F16K 17/02; B60Y 2200/14; B60Y 2400/81
    USPC ........................ 96/143, 144; 34/472, 473, 80
    See application file for complete search history.

(56) References Cited

U.S. PATENT DOCUMENTS

| | | | |
|---|---|---|---|
| 2007/0096554 A1 | 5/2007 | Detlefs et al. | |
| 2007/0246998 A1* | 10/2007 | Diekmeyer | B60T 17/004 303/9.61 |
| 2010/0186827 A1 | 7/2010 | Ertl | |
| 2011/0259189 A1 | 10/2011 | Diekmeyer et al. | |
| 2012/0175202 A1 | 7/2012 | Pahle et al. | |
| 2012/0306259 A1* | 12/2012 | Minato | B60T 13/662 303/6.01 |
| 2012/0325327 A1 | 12/2012 | Eggebrecht et al. | |
| 2013/0296899 A1* | 11/2013 | Deem | A61B 17/1114 606/153 |
| 2017/0122391 A1 | 5/2017 | Pahle et al. | |
| 2017/0152875 A1 | 6/2017 | Frank et al. | |
| 2019/0263212 A1* | 8/2019 | Ito | B60G 17/0565 |
| 2020/0240446 A1* | 7/2020 | Schnittger | F15B 21/044 |

FOREIGN PATENT DOCUMENTS

| | | |
|---|---|---|
| CN | 102781747 A | 11/2012 |
| CN | 102869554 A | 1/2013 |
| CN | 104349956 A | 2/2015 |
| CN | 104930019 A | 9/2015 |
| CN | 106470855 A | 3/2017 |
| DE | 35 25 083 A1 | 1/1987 |
| DE | 196 20 851 A1 | 12/1997 |
| DE | 198 18 496 A1 | 4/1999 |
| DE | 199 18 069 A1 | 11/2000 |
| DE | 103 57 763 A1 | 3/2005 |
| DE | 10 2004 026 624 B3 | 6/2005 |
| DE | 10 2005 057 004 B3 | 4/2007 |
| DE | 10 2005 057 003 A1 | 6/2007 |
| DE | 10 2010 026 070 A1 | 1/2011 |
| DE | 10 2011 014 274 A1 | 9/2012 |
| DE | 10 2013 007 086 A1 | 10/2014 |
| DE | 10 2013 011 785 A1 | 1/2015 |
| DE | 10 2014 107 228 A1 | 11/2015 |
| EP | 2 039 576 A2 | 3/2009 |
| EP | 2 127 727 A1 | 12/2009 |
| EP | 3 121 078 A1 | 1/2017 |
| ER | 2 829 744 A2 | 1/2015 |
| JP | 2003-528264 A | 9/2003 |
| JP | 2011-157052 A | 8/2011 |
| WO | WO 02/01088 A1 | 1/2002 |
| WO | WO 2009/154548 A1 | 12/2009 |

OTHER PUBLICATIONS

Japanese-language Office Action issued in Japanese Application No. 2020-532776 dated Aug. 23, 2021 with English translation (14 pages).

German-language Office Action issued in German Application No. 10 2017 129 908.4 dated Jul. 23, 2018 (six pages).

International Search Report (PCT/ISA/210) issued in PCT Application No. PCT/EP2018/083450 dated Mar. 21, 2019 with English translation (seven (7) pages).

German-language Written Opinion (PCT/ISA/237) issued in PCT Application No. PCT/EP2018/083450 dated Mar. 21, 2019 (seven (7) pages).

International Preliminary Report on Patentability (PCT/IB/326 & PCT/IB/373) issued in PCT Application No. PCT/EP2018/083518 dated Jun. 25, 2020, including English translation of document C2 (German-language Written Opinion (PCT/ISA/237 previously filed on Jun. 12, 2020)) (eight (8) pages).

Russian-language Office Action issued in Russian Application No. 2020119058/11(032323) dated Sep. 2, 2020 with English translation (17 pages).

Japanese-language Office Action issued in Japanese Application No. 2020-532776 dated Feb. 28, 2022 with English translation (four (4) pages).

International Search Report (PCT/ISA/210) issued in PCT Application No. PCT/EP2018/083518 dated May 6, 2019 with English translation (six (6) pages).

German-language Written Opinion (PCT/ISA/237) issued in PCT Application No. PCT/EP2018/083518 dated May 6, 2019 (five (5) pages).

\* cited by examiner

ARRANGEMENT FOR A UTILITY VEHICLE

BACKGROUND AND SUMMARY OF THE INVENTION

The present invention relates to an arrangement, in particular an arrangement for a utility vehicle, having at least one air dryer unit and a regulating unit.

In brake systems for trucks, air-treatment components are used, which have substantially the two main functionalities of air drying and circuit protection or regulating the air drying process.

In this case, the air dryer unit normally has an air dryer cartridge, a discharge valve, a heater and a consumer non-return valve.

Systems known from the prior art are disclosed, for example, in EP 2 829 744 A2 or DE 10357763 A1, DE 19620851 A1 and EP 2 039 576 A2.

The object of the present invention is to further develop an arrangement of the type mentioned at the outset in an advantageous manner, in particular in such a way that the main functionalities of air-treatment components, namely air drying and circuit protection, can be accommodated in separate housings and units in order to enable a spatially separate connection of the housing.

This object is achieved according to the invention by an arrangement, in particular an arrangement for a utility vehicle, having at least one air dryer unit and having a regulating unit, wherein the air dryer unit and the regulating unit are each designed as separate units, wherein the air dryer unit has at least one air dryer cartridge, at least one discharge valve and at least one control line for pneumatically controlling the discharge valve, wherein, in the air dryer unit, following the air dryer cartridge, at least one connecting line is provided, which leads directly to a consumer non-return valve for the air dryer unit, which is located outside the air dryer unit, wherein the connecting line is at least partially bi-directionally usable and/or is connectable or connected to a bi-directionally usable line section.

The invention is based on the basic idea of constructing the air dryer unit separately and more simply and therefore being able to install the air dryer unit spatially separately from the other housing components with the regulating unit. In this case, on the one hand, the air dryer unit, with its air drying function, is maintained accordingly, but, at the same time, regeneration is enabled. As a result of the connecting line, which leads directly and in an unthrottled manner to a consumer non-return valve located outside the air dryer unit, it is achieved that the air dryer unit can be constructed more simply overall.

It is further provided that the connecting line is bi-directionally usable.

The connecting line or a bi-directionally usable line section can be a bi-directionally usable line. In particular, the bi-directionality can consist in that, in one flow direction, the line serves as a supply line for supplying pressure to consumers which, in this flow direction (i.e. coming from the compressor through the air dryer unit), are arranged downstream of the air dryer unit. The other flow direction is then used for a flow to pass through the air dryer unit in the other direction for the regeneration process.

In particular in a first operating state, a flow is enabled in a first direction and, in a second operating state, a flow is enabled in a second direction contrary to the first direction.

In this case, the first operating state is, for example, the normal operating state, in which the air dryer unit is used to dry the provided compressed air. The second operating state, in this case, is then regeneration, in which the desiccant cartridge is regenerated accordingly and the flow passes through it in the direction contrary to that of the first operating state.

Therefore, in a first housing, the function of air drying by means of the air dryer cartridge can be provided in a conventional form. The compressed air coming from the compressor can then be cleaned and dried by means of the air dryer cartridge.

The corresponding non-return valve is arranged elsewhere.

The valves required for the circuit protection can then be arranged in the second housing, as well as the regeneration devices needed for the air dryer unit.

The air dryer unit can therefore be arranged spatially separately from the other components of the arrangement and, in this case, only a compressed-air supply line in the form of the connecting line is required.

The air dryer unit has a discharge valve. This discharge valve is, in particular, expedient for a regeneration process in order to enable the air used for the regeneration process to be discharged via the discharge valve.

The air dryer unit further has a line for pneumatically controlling the compressor. This enables an altogether simpler and possibly more robust construction of the arrangement to be achieved.

The control line is therefore further used in addition to the connecting line, so that a total of only two external lines need to lie between the air dryer unit and the regulating unit.

The control of the discharge valve is implemented via the control line. The discharge valve is required, for example, in the second operating state for the regeneration process.

The air dryer unit and the other housing components, namely the regulating unit, can be arranged spatially separately from one another and are then connected to one another by two external compressed air lines.

The first compressed air line can serve to control the discharge valve in the air dryer unit.

The second compressed air line conducts the dry air from downstream of the air dryer cartridge into the at least one other housing component.

If a defect or crack occurs in this line, namely the connecting line, then, as a result of the proposed arrangement of the consumer non-return valve, it can be ensured here that the compressed air of the different brake circuits cannot escape via the defective line.

Therefore, the inventive arrangement enables an arrangement of the consumer non-return valve outside the air dryer unit, wherein, at the same time, reliable and spatially separate installation is possible without having to compromise on safety.

It is moreover contemplated that the line additionally serves for pneumatically controlling a compressor. The functional integration is thus ensured.

It can furthermore be provided that the connecting line is merely a connecting line without pneumatic elements. A particularly more simple construction of the arrangement as a whole, but also of the air dryer unit, is thus enabled. In particular, the connection between the air drying elements of the air dryer unit to the consumer non-return valve is configured particularly simply and pneumatic throttling does not take place, nor are any other valves or pneumatic elements or the like provided here.

The connecting line can be unthrottled or can be without a throttle element.

It is moreover possible that the connecting line leads to the system boundary of the air dryer unit and is connectable there to a further line or, in the installed state of the arrangement, is connected to a further line. The connecting line can be connected to air drying elements of the air dryer unit, such as the desiccant cartridge for example, and can lead directly, without further pneumatic elements, to the system boundary, i.e. to the housing outer wall, for example, and a connection located there.

It can moreover be provided that the consumer non-return valve, which is coupleable or coupled to the connecting line, is arranged in the regulating unit. It is thus possible to integrate the necessary consumer non-return valve in the regulating unit so that only pneumatic connecting lines need to be arranged between the air dryer unit and the regulating unit.

It can furthermore be provided that, in the regulating unit, a further additional non-return valve is provided, which is coupleable or coupled to the connecting line, wherein the additional non-return valve enables a flow to pass through the connecting line in a direction which is contrary to the permitted flow direction of the consumer non-return valve. As a result of the additional non-return valve, further protection of the necessary pneumatic lines for the regeneration of the air dryer unit is provided.

It can furthermore be provided that the connecting line is connectable to a line or, in the installed state of the arrangement, is connected to a line, in which a further additional non-return valve is provided, which is coupleable or coupled to the connecting line, wherein the additional non-return valve enables a flow to pass through the connecting line in a direction which is contrary to the permitted flow direction of the consumer non-return valve. Additional non-return valves can be provided here in the connecting lines between the air dryer unit and the regulating unit. In particular, additional functionalities are thus enabled.

The connecting line and the control line can be designed as adapters. It is, in particular, contemplated that the connecting line and the control line are combined to form an adapter which connects the air dryer unit and the regulating unit to one another in the installed state.

It can furthermore be provided that a control line is integrated and/or guided in the connecting line. It is contemplated, for example, to use double-pipe systems or multi-hose systems here. A space-saving arrangement and construction are thus enabled. This embodiment can be designed, in particular, in the form of an adapter.

In this context, it is also contemplated that such an integration of a plurality of connecting lines inside one another is also associated with common plugs so that the connection of the air dryer unit to the regulating unit has comparatively few connecting points and possibly only a single plug needs to be connected.

The air dryer unit can have an air dryer module, in particular an air dryer cartridge.

It can furthermore be provided that the air dryer unit has at least one discharge valve.

The discharge valve can be controlled, for example, by the additional control line, which comes from the regulating unit.

It can moreover be provided that the air dryer unit has at least one heater. The heating function can be optional and can serve to prevent the air dryer unit from freezing and icing-over, in particular in cold external temperatures. However, a heating function is, in any case, an optional function.

The regulating unit can moreover have a multi-circuit protection valve.

It can moreover be provided that the regulating unit has a regeneration device for regeneration of the air dryer unit.

The air dryer unit can therefore have, in particular, the elements air dryer cartridge, discharge valve and optional heater, wherein, in comparison to previous solutions, the consumer non-return valve is no longer provided in the air dryer unit.

The further components, referred to here as the regulating unit, therefore comprise, for example, the main non-return valve, a plurality of valves for circuit protection, such as overflow valves or non-return valves upstream of the individual circuits, a device for carrying out the regeneration of the desiccant cartridge and corresponding pressure sensors.

The air dryer unit and the control unit can be arranged spatially separately from one another and then be connected to one another, for example by two external compressed air lines.

The first compressed air line therefore serves for controlling the discharge valve of the air dryer unit. The second compressed air line conducts the dry air downstream of the desiccant cartridge into the at least one other housing component, in particular the regulating unit here.

A pneumatic control and/or regulating unit can be provided in the regulating unit, which provides pneumatic control signals for controlling the compressor and/or the discharge valve.

This control signal can also be provided independently of the system pressure.

It is contemplated that one or more safety valves or non-return valves are provided to protect the control line for the pneumatic control signals for controlling the compressor and/or the discharge valve.

As a result of this construction, it is also contemplated that the compressor and the discharge valve are switched synchronously.

In this case, the discharge valve can be switched, for example, via the system pressure and/or a separate control input.

The present invention furthermore relates to an air dryer unit for an arrangement as described above. In this case, the air dryer unit has only the structural and/or functional features of an air dryer unit of an inventive arrangement or the inventive embodiments of the arrangement.

The present invention moreover relates to a regulating unit for an arrangement as described above. In this case, the regulating unit has only the structural and/or functional features of a regulating unit of an inventive arrangement or the inventive embodiments of the arrangement.

The present invention moreover relates to an adapter for an arrangement as described above. In this case, the adapter has only the structural and/or functional features of an adapter for connecting an air dryer unit and a regulating unit of an inventive arrangement or the inventive embodiments of the arrangement.

Further details and advantages of the invention shall now be explained with reference to an exemplary embodiment illustrated in more detail in the drawings.

DETAILED DESCRIPTION OF THE DRAWINGS

Figure 1:
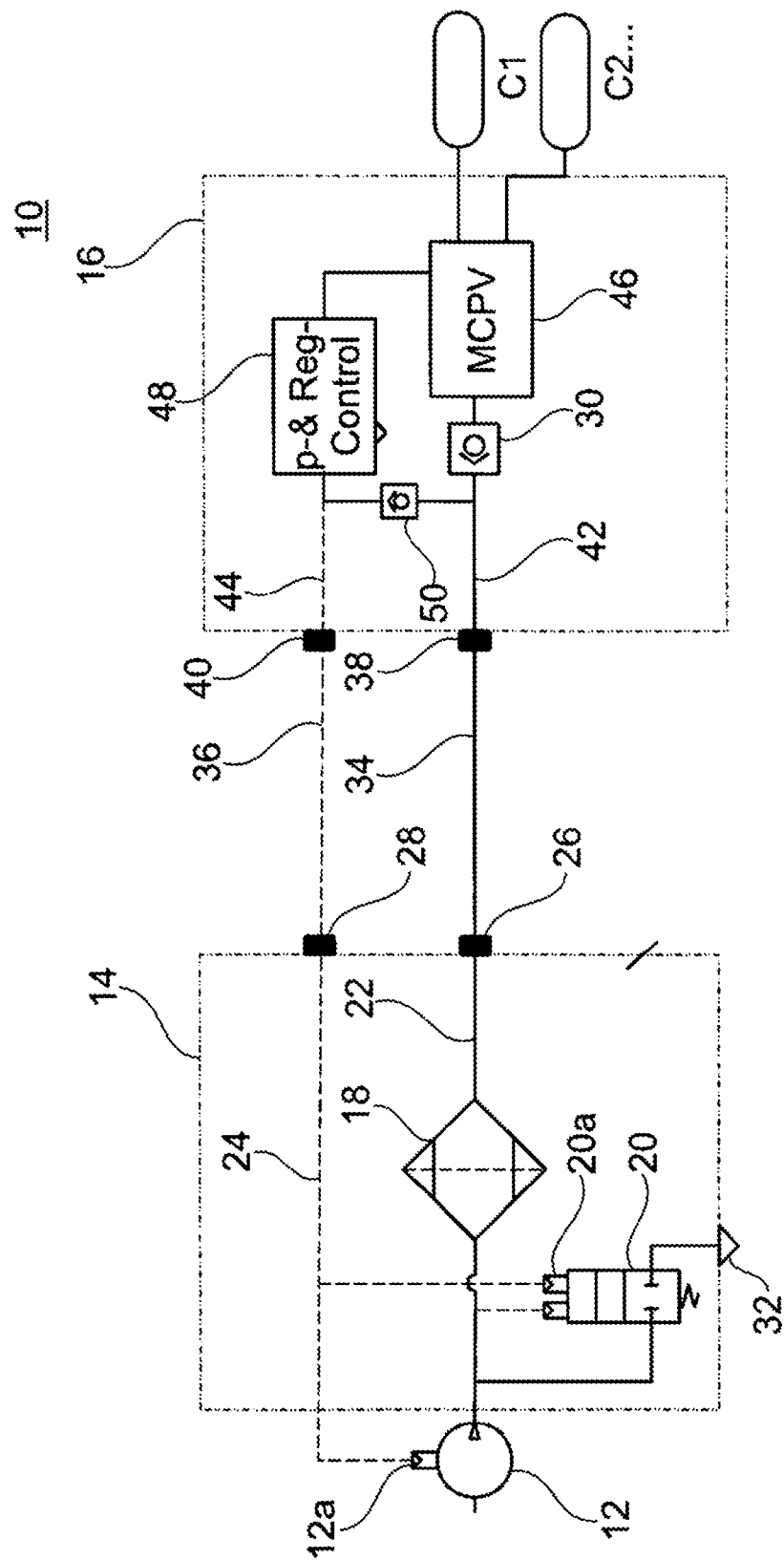
FIG. 1 is a first exemplary embodiment of an inventive arrangement for a utility vehicle with an air dryer unit and a regulating unit.

FIG. 1 shows, in a schematic illustration, an inventive exemplary embodiment of an arrangement 10 for a utility vehicle with a compressed air source 12, an air dryer unit 14 and a regulating unit 16.

The air dryer unit 14 and the regulating unit 16 are each constructed as separate structural units.

In particular, both units, i.e. the air dryer unit 14 and the regulating unit 16 are also constructed as a separate and structurally separate unit with respect to the compressor 12.

It is contemplated that the air dryer unit 14 and the regulating unit 16 are adjacently arranged and secured. In particular, it is contemplated here, but not imperative, that the air dryer unit 14 and the regulating unit 16 are secured or flanged to a common securing plate or a common securing element. It is, however, also contemplated that the air dryer unit 14 and the regulating unit 16 each have a separate securing element or a separate securing plate or a separate securing flange.

In particular, the air dryer unit 14 as a whole is designed to be fully replaceable.

The air dryer unit 14 further has an air dryer cartridge 18, a discharge valve 20, a connecting line 22 and a control line 24.

The connecting line 22, in this case, connects the air dryer cartridge 18 to a connection 26 provided at the system boundary of the air dryer unit 14, i.e. on the housing exterior of the air dryer unit 14.

The control line 24 is likewise connected to a connection 28 connected to the housing of the air dryer unit 14.

The connecting line 22 is designed merely as a connecting line without pneumatic elements.

In particular, this connecting line 22 connects the air dryer unit 14 directly, and in an unthrottled manner, to a consumer non-return valve 30, which is located outside the air dryer unit 14 and, in the exemplary embodiment shown, is arranged in the regulating unit 16.

The consumer non-return valve 30 also serves as a so-called main non-return valve for the air dryer unit 14 here.

The control line 24 serves for controlling the compressed air source 12 via the control connection 12a and for controlling the discharge valve 20 via the associated control connection 20a of the discharge valve 20.

In this case, the discharge valve 20 is designed as a 2/2-valve (pneumatically controlled).

A construction as a 3/2-way valve is also contemplated.

In the state shown, the discharge valve 20 is closed and the discharge 32, which is located at the system boundary of the air dryer unit 14, is blocked.

In particular, it is provided that the discharge 32 is arranged on the housing exterior of the air dryer unit 14.

The connections 26 and 28 are each connected to further lines, wherein the connection 26 is connected to a connecting line 34 and the connection 28 is connected to a connecting line 36.

In this case, the line 36 is connected to the control connection 12a of the compressor 12 and to the control connection 20a of the discharge valve 20.

The regulating unit 16 has connections 38 and 40 at its system boundary.

In this case, the connection 38 is connected to the connecting line 34 and the connection 40 is connected to the connecting line 36.

The connection 38 leads to an inner line 42 in the interior of the housing of the regulating unit 16.

The connection 40 leads to an inner line 44.

The regulating unit 16 has, in its interior, i.e. in the interior of its housing, a multi-circuit protection valve 46 and a (control) unit 48 for carrying out the regeneration of the desiccant cartridge.

A further non-return valve 50 is moreover provided.

The consumer non-return valve 30 is connected to the line 42 in such a way that air arriving from the air dryer unit 14 via the lines 22 and 34 can pass through and flow through the non-return valve 30. This operating state corresponds to the normal operating state, in which a compressed air supply for further consumers C1 and/or C2 is provided and drying takes by means of the air dryer unit 14.

For the regeneration process, the non-return valve 30 is in the blocking position and, via the unit 48, compressed air can flow through the non-return valve 50 and then "backwards" through the air dryer cartridge 18 via the lines 42, 34 and 22.

The line 34 can therefore be used bi-directionally; namely, on the one hand, for supplying compressed air to the consumers (flow direction from left to right in FIG. 1) and, on the other, for the regeneration of the air dryer unit 14 and, in particular, the air dryer cartridge 18 (flow direction from right to left in FIG. 1).

The consumer non-return valve 30, which is coupleable, or here coupled, to the connecting line 22, is therefore arranged in the regulating unit 16.

Moreover, a further additional non-return valve 50, which is coupleable or coupled to the connecting line 22, is provided in the regulating unit 16, wherein the additional non-return valve 50 enables a flow to pass through the connecting line 22 in a direction which is contrary to the permitted flow direction of the consumer non-return valve 30.

In this context, the discharge valve 20 must then also be switched over accordingly via its pneumatic control 20a, so that the discharge 32 is opened. The corresponding pneumatic control signal is likewise provided via the unit 48 and the lines 24, 36 and 44.

The compressor 12 can be controlled accordingly, i.e. switched on and switched off, via the line 36 and the line 24, which is located in the air dryer unit 14 and is connected to the control connection 12a of the compressor 12.

The unit 48 provides the corresponding pneumatic control signal for this.

This control signal can also be provided independently of the system pressure.

The control valve 50 also serves this purpose in the embodiment shown.

As a result of this construction, the compressor 12 and the discharge valve 20 can be switched synchronously.

In this case, the discharge valve 20 can be switched, for example, via the system pressure and/or a separate control input.

In this context, it is essentially also contemplated that the connection of the control connection 12a of the compressor 12 takes place via a separate line, which is also guided outside the air dryer unit 14.

Figure 2:
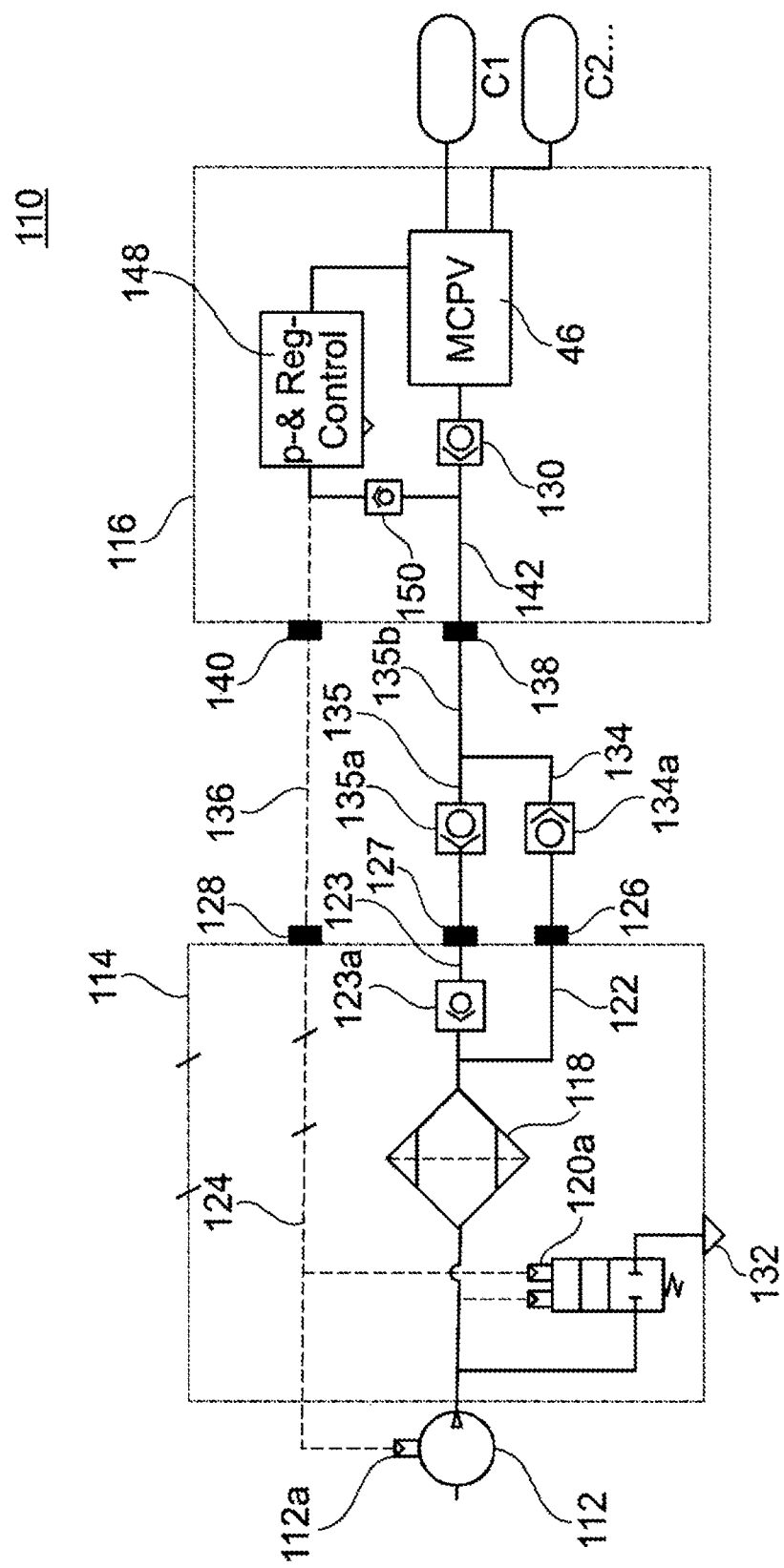
FIG. 2 is a further exemplary embodiment of an inventive arrangement.

FIG. 2 shows a modification of the embodiment of the arrangement 110 which is shown in FIG. 1.

Identical features are here denoted by values increased by 100.

In this case, the arrangement 110 shown in FIG. 2 has all the structural and functional features of the arrangement 10 shown in FIG. 1.

However, there are the following differences:

The arrangement 110 shown in FIG. 2 has, in addition to the line 122, a further line 123 with a non-return valve 123a, which permits a flow coming from the dryer cartridge 118 in the direction of the regulating unit 116. In this case, the line 123 leads into a connection 127. The line 122 leads into a line 134.

A non-return valve 134a, which only enables a flow coming from the regulating unit 116 in the direction of the air dryer unit 114, is arranged in the line 134. In this case, the line 135, in a first operating state, i.e. supplying compressed air to the consumers C1, C2, serves to provide and forward the cleaned and dried compressed air.

An additional (optional) non-return valve 135a is provided in the line 135.

This non-return valve 135a is here arranged such that a flow of compressed air coming from the dryer cartridge 118 in the direction of the regulating unit 116 is permitted.

The line 135 has a line section 135b, through which a bi-directional flow can pass and which substantially represents a joining of the lines 122, 123, 134 and 135.

It is contemplated that an in-circuit flow through the lines 122, 123 and 134 is prevented in the non-return valve 123a and/or 135a. For example, an additional electronic barrier can be provided here.

The line 134 serves in particular for the regeneration process.

The connecting line 122, in the installed state of the arrangement 110, is therefore connected to the line 134 in which a further additional non-return valve 134a is provided, which is coupleable or coupled to the connecting line 122, wherein the additional non-return valve 134a enables a flow to pass through the connecting line 122 in a direction which is contrary to the permitted flow direction of the consumer non-return valve 130.

In the embodiment shown in FIG. 2, it would also be contemplated to dispense with the non-return valve 150 and 130 in the regulating unit 116 completely.

Figure 3:
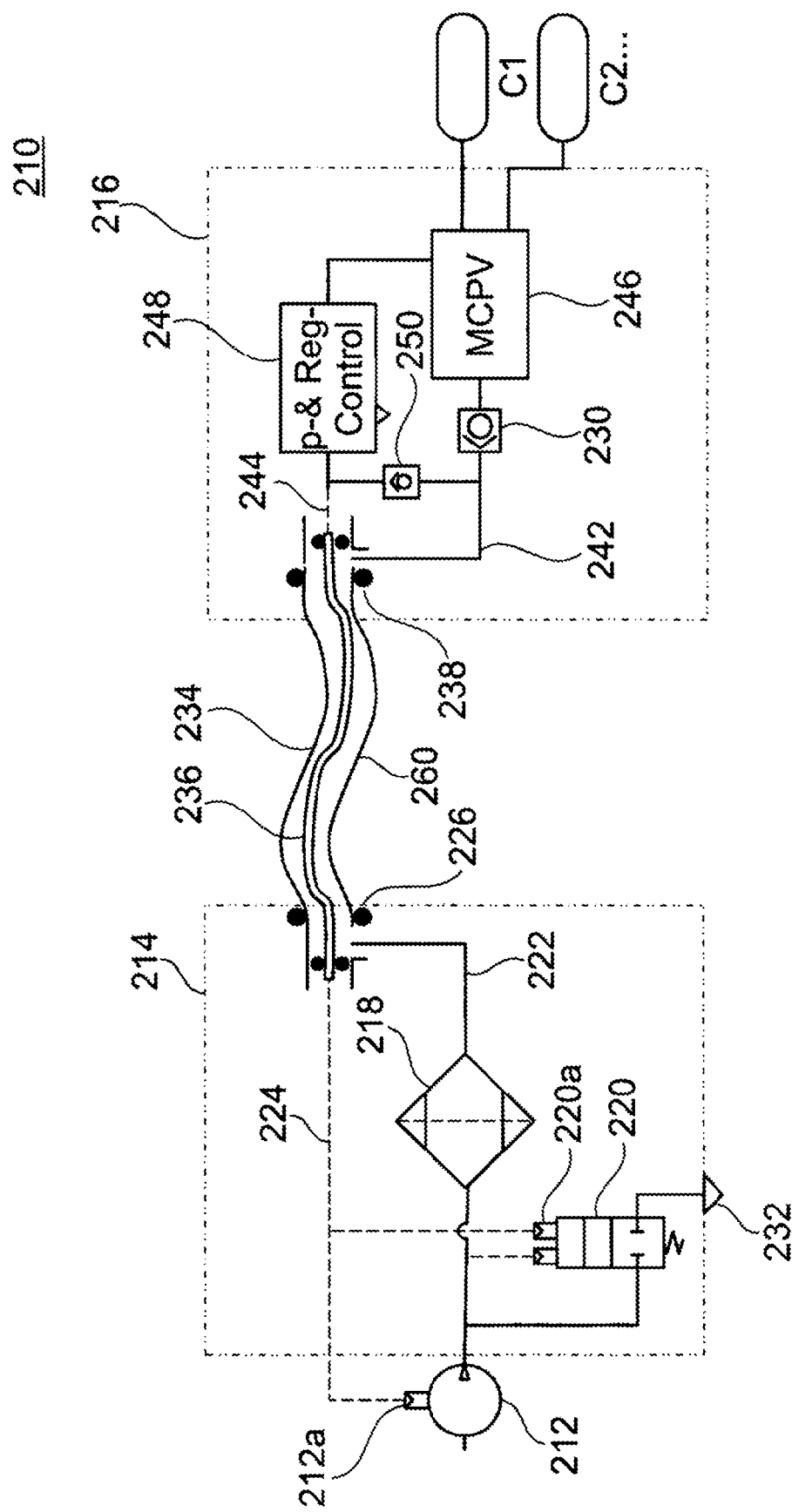
FIG. 3 is a third exemplary embodiment of an inventive arrangement.

FIG. 3 shows a further embodiment of an arrangement 210, which likewise has all the functional and structural features of the arrangement 10 shown in FIG. 1.

All corresponding features or components are denoted by identical reference signs, wherein the reference signs are, however, increased by a value of 200 for better comprehension and differentiation.

An essential difference here consists in that the connections 26 and 28 or 38 and 40 have been combined to form a common connection 226 or 238. In this case, the line 236 is guided in the line 234.

A control line 236 is therefore integrated in the connecting line 234.

The connecting line 222 and the control line 224 are designed as adapters 260.

The adapter 260 serves to connect the connection 226 (common connection for the connecting line 234 and control line 236 on the air dryer unit 214) and the connection 238 (common connection for the connecting line 234 and control line 236 on the regulating unit 216).

LIST OF REFERENCE SIGNS

10 Arrangement
12 Compressed air source
12a Control connection
14 Air dryer unit
16 Regulating unit
18 Air dryer cartridge
20 Discharge valve
20a Control connection
22 Connecting line
24 Control line
26 Connection
28 Connection
30 Consumer non-return valve
32 Discharge
34 Connecting line
36 Connecting line
38 Connection
40 Connection
42 Inner line
44 Inner line
46 Multi-circuit protection valve
48 (Control) unit
50 Non-return valve
110 Arrangement
112 Compressed air source
112a Control connection
114 Air dryer unit
116 Regulating unit
118 Dryer cartridge
120 Discharge valve
120a Control connection
122 Line
123 Line
123a Non-return valve
124 Control line
126 Connection
127 Connection
130 Consumer non-return valve
132 Discharge
134 Line
134a Non-return valve
135 Line
135a Non-return valve
135b Line section
136 Connecting line
138 Connection
140 Connection
142 Inner line
144 Inner line
146 Multi-circuit protection valve
148 (Control) unit
150 Non-return valve
210 Arrangement
212 Compressed air source
212a Control connection
214 Air dryer unit
216 Regulating unit
218 Air dryer cartridge
220 Discharge valve
220a Control connection
222 Connecting line
224 Control line
226 Connection
230 Consumer non-return valve
232 Discharge
234 Connecting line
236 Connecting line
238 Connection
242 Inner line
244 Inner line 246 Multi-circuit protection valve
248 (Control) unit
250 Non-return valve
260 Adapter
C1 Consumer
C2 Consumer

What is claimed is:

1. An arrangement for a utility vehicle, comprising:
at least one air dryer unit;
a regulating unit, wherein
the air dryer unit and the regulating unit are each configured as separate units,
the air dryer unit has at least one air dryer module, at least one discharge valve and at least one control line for pneumatically controlling the discharge valve,
in the air dryer unit, following the air dryer module, at least one connecting line leads directly to a consumer non-return valve for the air dryer unit, which is located outside the air dryer unit, and
the connecting line is at least partially bi-directionally usable and/or is connectable or connected to a bi-directionally usable line section.

2. The arrangement as claimed in claim 1, wherein the control line additionally serves for pneumatically controlling a compressor.

3. The arrangement as claimed in claim 1, wherein the connecting line is a connecting line without any pneumatic elements.

4. The arrangement as claimed in claim 1, wherein the connecting line is unthrottled and/or does not have a throttle element.

5. The arrangement as claimed in claim 1, wherein the connecting line leads to a system boundary of the air dryer unit and is connectable at the system boundary to a further line or, in the installed state of the arrangement, is connected to a further line.

6. The arrangement as claimed in claim 1, wherein the consumer non-return valve, which is coupleable or coupled to the connecting line, is arranged in the regulating unit.

7. The arrangement as claimed in claim 6, wherein in the regulating unit, a further additional non-return valve is coupleable or coupled to the connecting line, wherein the additional non-return valve enables a flow to pass through the connecting line in a direction which is contrary to a permitted flow direction of the consumer non-return valve.

8. The arrangement as claimed in claim 1, wherein the connecting line is connectable to a line or, in the installed state of the arrangement, is connected to a line, in which a further additional non-return valve is provided, and
the line is coupleable or coupled to the connecting line, wherein the further additional non-return valve enables a flow to pass through the connecting line in a direction which is contrary to the permitted flow direction of the consumer non-return valve.

9. The arrangement as claimed in claim 1, wherein the connecting line and the control line are designed as adapters and/or in that a control line is integrated and/or guided in the connecting line.

10. The arrangement as claimed in claim 1, wherein the air dryer unit has at least one heater.

11. The arrangement as claimed in claim 1, wherein the regulating unit has a multi-circuit protection valve.

12. The arrangement as claimed in claim 1, wherein the regulating unit has a regeneration device for regeneration of the air dryer unit.

13. The arrangement as claimed in claim 1, wherein the air dryer module is an air dryer cartridge.

* * * * *